Figure 1:
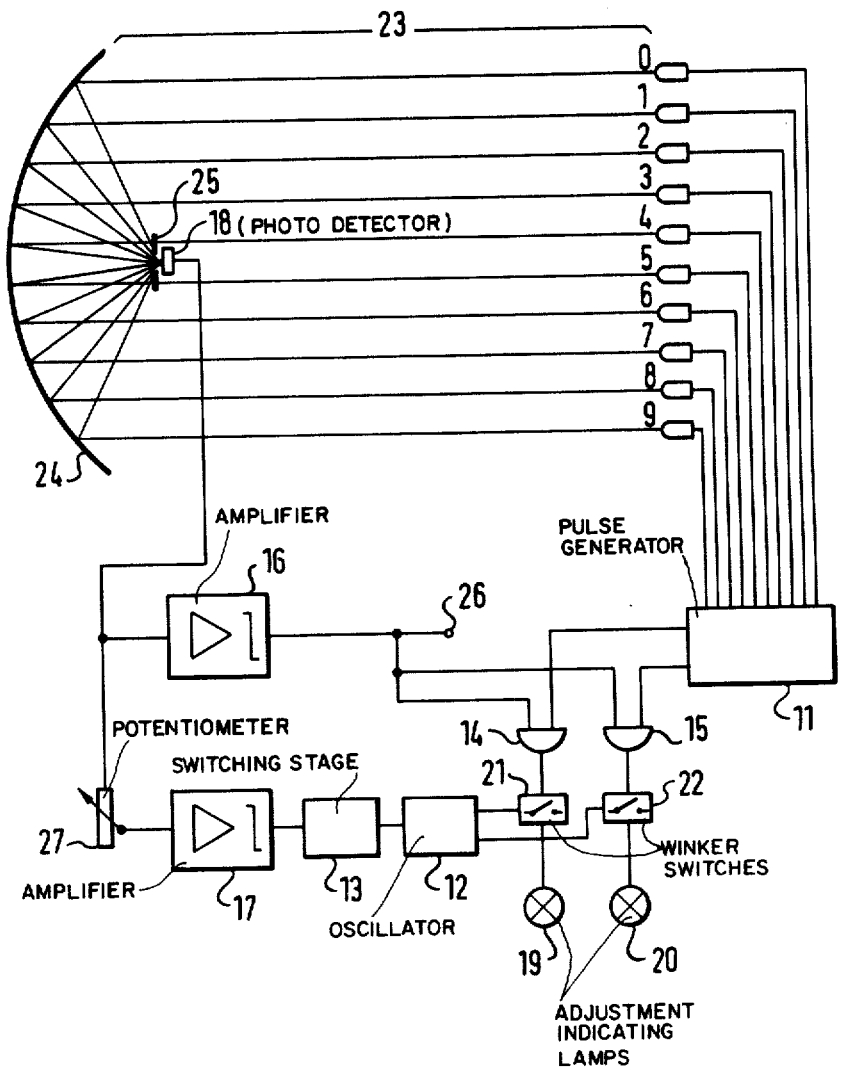

United States Patent [19]

Sick et al.

[11] 4,310,756

[45] Jan. 12, 1982

[54] LIGHT GRID ARRANGEMENT USING CYCLICALLY SWITCHED SEMICONDUCTOR LIGHT SOURCES

[75] Inventors: Erwin Sick, Icking; Günter Fetzer, Gundelfingen, both of Fed. Rep. of Germany

[73] Assignee: Erwin Sick GmbH Optik-Elektronik, Waldkirch, Fed. Rep. of Germany

[21] Appl. No.: 96,959

[22] Filed: Nov. 23, 1979

[30] Foreign Application Priority Data

Nov. 28, 1978 [DE] Fed. Rep. of Germany ....... 2851444

[51] Int. Cl.³ .............................................. G01V 9/04
[52] U.S. Cl. .................................... 250/221; 340/556
[58] Field of Search ........................ 250/221, 222 R; 340/555, 556, 573

[56] References Cited

U.S. PATENT DOCUMENTS

| | | | |
|---|---|---|---|
| 1,345,586 | 7/1920 | Coblentz | 250/221 |
| 2,284,289 | 5/1942 | Lindsay | 340/555 |
| 2,769,374 | 11/1956 | Sick | 250/221 |
| 3,858,043 | 12/1974 | Sick et al. | 250/221 |

*Primary Examiner*—David C. Nelms
*Assistant Examiner*—Edward P. Westin
*Attorney, Agent, or Firm*—Townsend and Townsend

[57] ABSTRACT

A light grid arrangement features a row of light emitting diodes 0 to 9 which are periodically switched on one after the other by a ring counter 11 and are arranged to direct their light through a monitoring region 23 towards an image forming optical means which is conveniently in the form of a concave mirror 24. The light beams are concentrated by the concave mirror 24 onto a photodetector 18 arranged behind a slot aperture 25 located at the focal point of the concave mirror. Missing pulses from the photodetector are detected by processing circuitry 26 to indicate obstruction of the light grid. The width of the slot aperture 25 restricts the width of each individual light beam so that only beams of light from the light emitting diodes that are generally parallel to the axis of the concave mirror are detected. In this way costly optical focussing elements are avoided as are the difficulties of aligning these optical elements with the other optical components of a system. The length of the monitored region can be increased as desired by placing a number of concave mirror and light emitting diode arrangements alongside one another.

16 Claims, 5 Drawing Figures

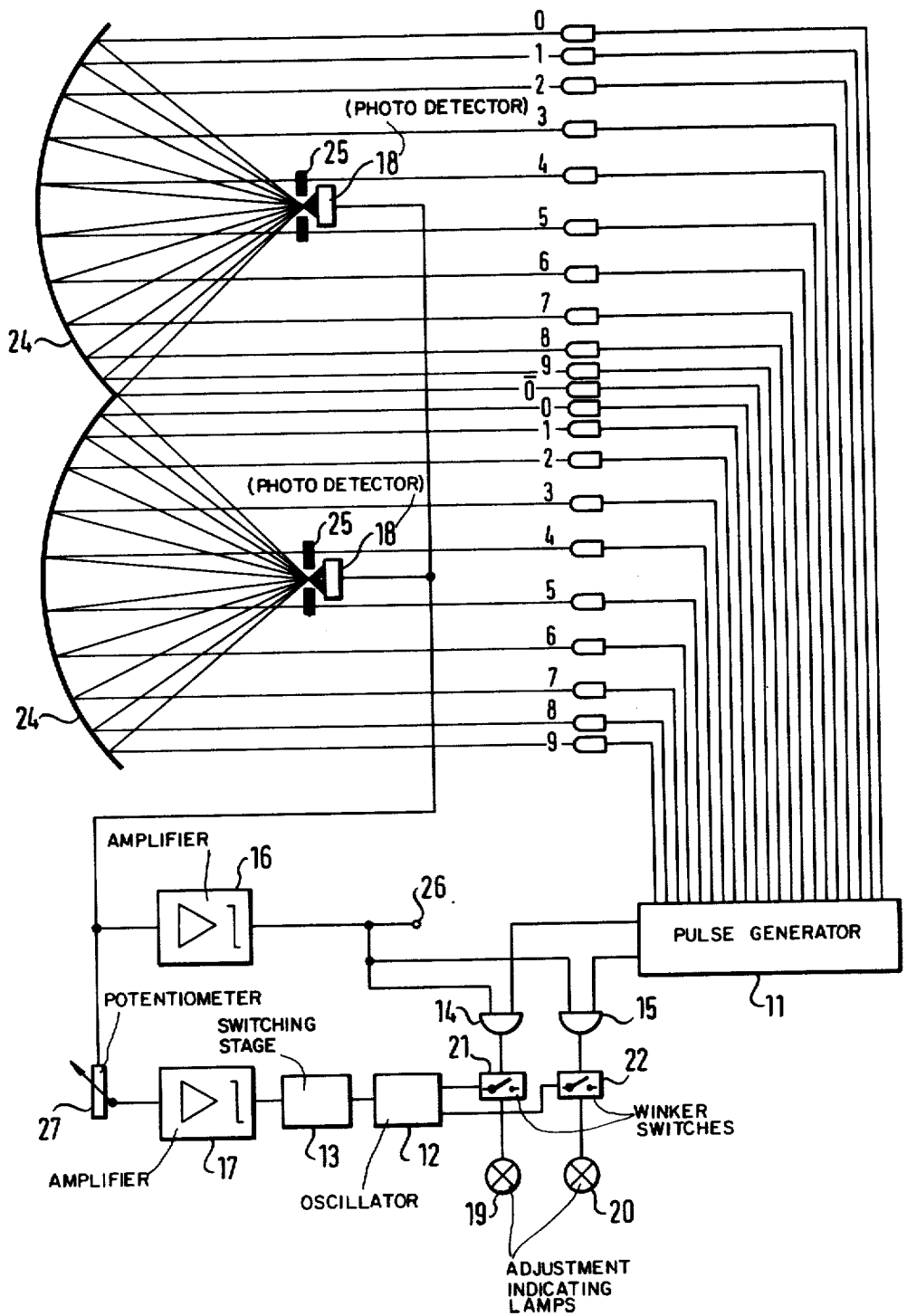

LIGHT GRID ARRANGEMENT USING CYCLICALLY SWITCHED SEMICONDUCTOR LIGHT SOURCES

The invention relates to a light grid arrangement comprising a row of light emitting semiconductor elements which are periodically and cyclically switched on one after the other, a monitoring region and image forming optical means which receives the light transmitted from the diodes through the monitoring region and which concentrates this light onto a photodetector.

Light grid arrangements of this kind can be used to detect the presence of an object or obstacle within the monitored region. It is important to achieve as high a resolution as possible, i.e. the recognition of as small an obstacle as possible, within the largest possible monitoring region between the row of light emitting semiconductor elements and the image forming optical means. For known light grid arrangements, which essentially comprise an arrangement in series of a number of light barriers with separated transmitters and receivers, this can generally only be ensured by the arrangement at at least each light source or each receiver of an optical device which makes parallel the radiated light beam, or the received light beam respectively. This separate, parallel beam forming optical device for each transmitter or receiver must be very accurately aligned with the neighbouring light beams and this requirement gives rise to a considerable degree of trouble and expense.

The object underlying the invention is thus to provide a light grid arrangement of the initially named kind in which this parallel beam forming optical device and its alignment are realized in the simplest possible manner.

For accomplishing this object the invention envisages arrangements characterized in that a slot aperture is located at the focal point of the image forming optical means, that the slot of said slot aperture extends substantially at right angles to said row of light emitting semiconductor elements and that the width of said slot is so chosen that the light leaving the light emitting semiconductor elements is trimmed in the direction of the row, whereby only a part of the light beam which is received by said image forming optical means can reach said photodetector which is arranged behind, and indeed preferably directly behind, said slot aperture and which receives all the light passing through said slot. The combination of the relatively simple image forming optical means together with the slot aperture ensures that only light which is approximately parallel to the optical axis of the image forming optical means can reach the photodetector or receiver. Suitable light emitting semiconductor elements are commercially readily available at low cost in the form of light emitting diodes. A crucial factor for the operability of this system is that the focal length of the image forming optical means is so chosen in relation to the spacing of the light emitting diodes from the image forming optical means that the image plane formed by the image forming optical means of the images of the light emitting diodes lies distinctly behind the focal distance, i.e. behind the slot aperture. The width of the slot should be so chosen in relation to the focal distance of the image forming optical means that only the useful light beams of neighbouring light emitting diodes overlap. In particular the degree of overlap between the useful light beams of neighbouring light emitting diodes should lie in the range from $\frac{1}{8}$ to $\frac{7}{8}$ and preferably $\frac{1}{2}$. The overlap being referred to the width of the useful light beams at the image forming optical means. The ratio of the width of the slot to the focal distance of the image forming optical means should lie in that case in the range between $0.2 \times 10^{-3}$ and $2.0 \times 10^{-3}$. The location of the photodetector or receiver behind the slot aperture can be chosen as desired. Care must solely be taken that all the light which passes through the slot aperture reaches the photodetector. This is most sensibly realized if the photodetector is arranged directly behind the slot aperture.

It is thus significant for the invention that the light emitting diodes which are particularly conveniently available in the form of GaAs diodes (gallium arsenide), are not located at infinity with reference to the image forming optical means but rather at a finite distance. In this way the sharp image plane of the light emitting diodes at the receiver side does not lie at the focal point of the image forming optical means, which is preferably in the form of a concave mirror, but rather by a distinct amount behind the focal point. In this manner the slot aperture can itself be arranged at the focal point so that the slot aperture, in dependence on its width, so limits the light beam which reaches the photodetector that any desired width of useful light beam can be realized directly at the image forming optical means. Thus, in accordance with the invention, the limiting of the effective received beam envelope takes place individually and solely through the angle which the light beam from the transmitter forms with the optical axis. For each impingement position of the beams on the image forming optical means it is only possible for radiation coming from a limited angular range to pass through the aperture and thus to reach the photodetector. The beam envelope is thus determined in accordance with the invention to any desired degree of accuracy by a very simple constructional measure. Limits are solely set by the intensity of the light which must pass through the slot aperture in order to produce response of the photodetector arranged behind the aperture.

A customary electronic processing circuit is connected to the photodetector.

The resolution capability of the light grid arrangement in accordance with the invention is determined on the transmitter side, i.e. directly in front of the light emitting diodes, by the center spacing of the light emitting diodes and their diameter. The smallest obstacle which can be recognized with certainty in front of the transmitter has the size of the center to center spacing of two neighbouring light emitting diodes plus the diameter of a light emitting diode.

The resolution capability of the light grid arrangement at that end of the monitoring region which lies directly in front of the image forming optical means is specified by the size of the aperture, the zenith distance of the aperture, the distance from transmitter to receiver, the focal length of the image forming optical means and the height of the monitoring region.

By suitable choice of these parameters the resolution capability can be held substantially constant over the whole length of the monitoring region.

For functional reasons it is preferred for the focal length of the image forming optics, in relation to the object distance, to be chosen to be of such a size that a distance of the order of magnitude of at least some millimeters is present between the slot aperture and the image plane. Furthermore the object distance should at a maximum be from 10 to 50 times, preferably from 20 to 40 times and especially 25 to 35 times as large as the focal length of the image forming optical means.

An especially advantageous constructional form of the invention is so arranged that the image forming optical means is of strip-like construction and extends parallel to the row of light emitting diodes.

The image forming optical means is usefully in the form of a concave mirror, because this is easier to manufacture in a length which takes in the whole monitored region than an elongate lens, and because only a single optical surface needs to be worked.

In order, when using a concave mirror to avoid the receiving device disturbing the monitoring regions the concave mirror is usefully so tilted about its longitudinal axis that the photodetector or receiver and the aperture stop lie outside of the monitoring region.

It is especially advantageous if the slot width is so chosen that only radiation which has a very narrow limited angle relative to the optical axis can pass through this slot aperture.

In order to achieve a larger monitoring region it can be arranged, in accordance with a particularly preferred embodiment of the invention, for a plurality of image forming optical means with slot aperture and photodetector to be arranged directly alongside and bordering each other. Thus practically any desired length of monitoring region can be realized by making rows of image forming optical means, slot apertures and photodetectors.

If a plurality of image forming optical means are arranged in a row then, for circuit reasons and in the simplest case the photodetectors can be connected in parallel to the electronic processing circuitry.

However it is also possible, particularly for a larger number of image forming optical means, slot apertures and photodetectors, to connect together specified photodetectors in groups. It is especially advantageous if the spacing of the light emitting diodes reduces in the outward direction away from the optical axis of the image forming optical means.

In this manner account can be taken in conceptually simple fashion of the fact that the resolution capability reduces to a greater or lesser degree towards the margins, in particular for larger aperture ratios of the image forming optical means. By reducing the diode spacing in the direction towards the margins this effect can be counteracted and a substantially constant resolution capability can be realized over the entire width of the image forming optical means.

Figure 2:
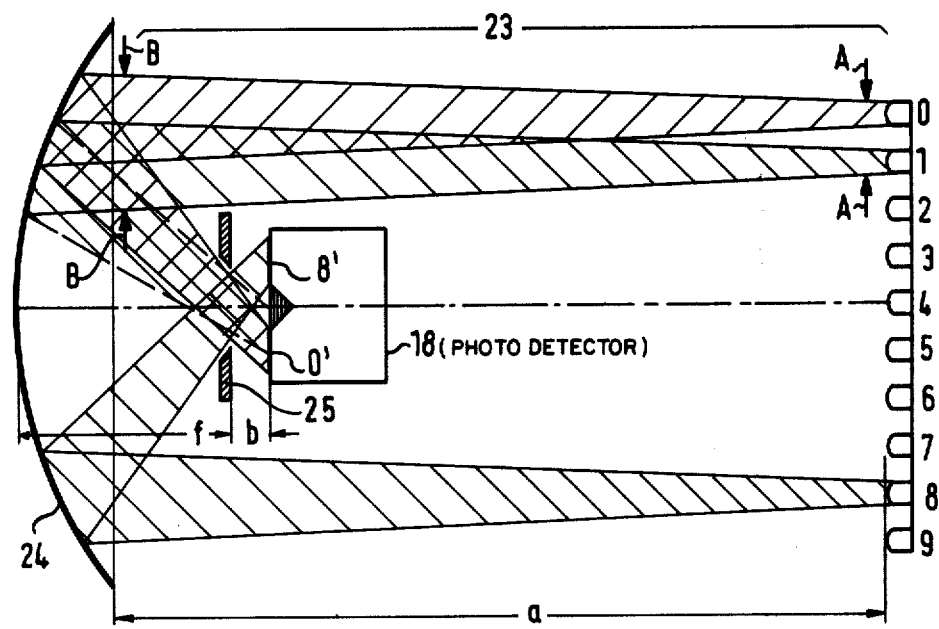
Figure 2A:
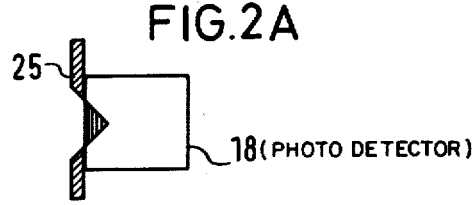
Figure 3:
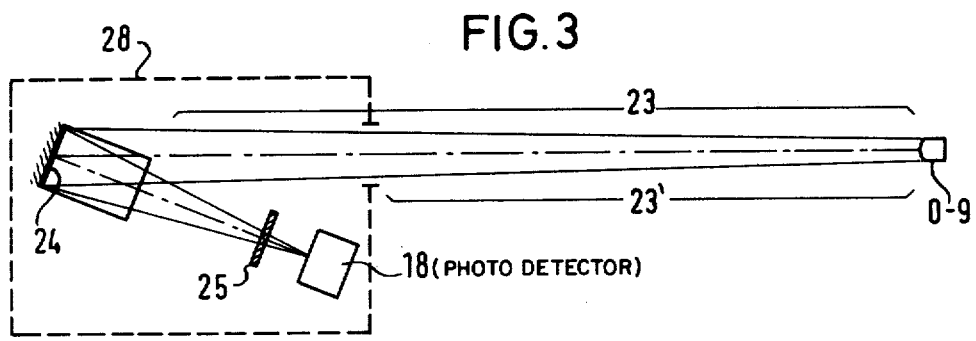

The invention will now be more specifically described in the following by way of example only and with reference to the accompanying drawings in which are shown:

FIG. 1 a schematic illustration of a light grid arrangement in accordance with the invention together with an advantageous electronic processing circuit therefor, FIG. 2 an enlarged schematic illustration of the light grid arrangement of FIG. 1 and in which some of the light beams sequentially radiated by the light diodes have been sketched in, FIG. 2a the preferred arrangement of the photodetector behind the slot aperture, FIG. 3 a partially sectioned plan view of the subject of FIG. 2, and FIG. 4 a light grid arrangement of doubled length in accordance with the invention and formed by arranging two image forming optical means, slot apertures and photodetectors in a row.

Referring firstly to FIG. 1 there can be seen 10 radiation sources in the form of gallium arsenide light emitting diodes 0 to 9 which are arranged in a line alongside one another and which direct their light through a monitoring region 23 to a concave mirror 24. A slot aperture 25 is arranged at the focal point of the concave mirror and a single photodetector 18 is located behind the slot aperture as will be explained in more detail with reference to the subsequent figures.

The gallium arsenide light emitting diodes 0 to 9 are cyclically excited to generate light flashes by means of a ring counter with pulse generator 11. At the output of the photoelectric detector 18, which is in the form of a photoelectric converter, there thus arises an electrical signal with rectangular pulses of a specified frequency.

On intervention in the monitoring region 23 one or more of the impulses of the output of the photoelectric converter 18 drop out. The pulse train is passed via an amplifier 16 having a first low switching threshold to an output terminal 26 to which a known form of monitoring circuit can be connected which generates a warning signal if one or more pulses are missing.

For the purpose of aligning the receiver 18, 24, 25 with the transmitters 0 to 9 the output signal of the amplifier 16 is additionally applied to the one inputs of two AND gates 14 and 15. The other inputs of the two AND gates receive input signals derived from the ring counter 11 from the transmitters 0 and 9. It is also possible to pass signals to the relevant inputs of the AND gates 14 and 15 from other ones of the ten transmitters than transmitters 0 and 9.

Preferably however the signals of the two outermost transmitters 0 and 9 are so applied as this is the most sensitive arrangement.

The outputs of the AND gates 14 and 15 are applied via controlled normally closed winker switches 21, 22 to adjusting lamps 19 and 20.

The signal from the photoelectric receiver 18 is also applied to a second amplifier 17 with a higher threshold than that of amplifier 16. The amplifier 17 is connected via a switching stage 13 and an oscillator 12 to the winker switches 21 and 22.

On lighting up of the radiation sources 0 and 9 input signals are thus present at the respective inputs of the AND gates 14 and 15. If the radiation sources 0 and 9 are not correctly aligned with photoconverter 18 then both other inputs of the gates 14 and 15 receive no signal and the adjustment indicating lamps 19 and 20 do not light up. If however a signal is present at the photoconverter 18 on lighting up of one or both of the transmitters 0 and 9 then input signals appear at one or both of the inputs of the AND gates 14 and 15 and the output signal formed by each of the gates will cause its associated adjustment indicating lamp 19 or 20 to light up. Further details of the adjustment aid are described in U.S. Patent Application Ser. No. 041,993 which is hereby incorporated by reference.

As seen in FIG. 2 the stop aperture 25 is so arranged at the distance of the focal length f from the zenith of the concave mirror 24 that its slot extends at right angles to the strip-like concave mirror 24 and to the row of light emitting diodes 0 to 9. The slot thus extends at right angles to the plane of the drawing of FIG. 2.

The photodetector 18 is so arranged in accordance with FIG. 2 that its surface is located in that plane in which the light illuminating diodes 0 to 9 are sharply imaged by the concave mirror 24. The object distance is designated with "a" and the distance of the image plane from the slot aperture 25 by "b". This illustration is however only chosen to make the beam paths readily comprehensible. The arrangement of the photodetector 11 in the image plane is indeed possible provided all the light passing through the slot reaches the photodetector. The preferred arrangement is however the provision of the photodetector 11 directly behind the slot aperture 25 in accordance with FIG. 2a.

The concave mirror 24 projects substantially only that light which is incident on the concave mirror parallel to its optical axis through the slot aperture 25 onto the surface of the photodetector 18.

The arrows A of FIG. 2 illustrate the resolution of the light grid arrangement at the transmitter. The smallest obstacle which can be recognized at the transmitter has the size of the spacing between the two arrows A, i.e. the size of the center to center spacing between two neighbouring light emitting diodes plus the size, or the diameter, of a single light emitting diode.

At the receiver side directly in front of the concave mirror 24 at the end of the monitoring region 23 the resolution of the light grid arrangement is shown by the spacing of the two arrows B. The divergence of the individual useful light beams leaving the light emitting diodes is specified by the ratio of the slot width 25 to the focal length of the concave mirror 24. In accordance with FIG. 2 the slot width is so chosen that the useful light beams from neighbouring light illuminating diodes overlap at the concave mirror by approximately one half of their width. The degree of overlap can conveniently lie within the range ⅓ to ⅔ of the useful light beam width at the concave mirror. It will be appreciated that, because of the cyclically switching of the light transmitters, no actual overlap will be present however that the envelopes defined by the individual light beams form a useful reference point for discussion of the geometry involved. The above described overlapping arrangement ensures on the one hand a sufficiently good light intensity at the photodetector 18 and on the other hand achieves a resolution at the end of the monitoring region 23 which is not significantly worse than the resolution at the transmitter side.

To the extent that the photodetector 18 and the slot aperture 25 are constructed to be very small they can lie within the monitoring region 23 because in this case these two elements only insignificantly interrupt the monitoring region 23.

A completely disturbance free arrangement of the monitoring region 23 can however also be realized in accordance with FIG. 3 by somewhat tipping the concave mirror 24 about is longitudinal axis relative to the incident light beams, so that the slot aperture 25 and the photodetector 18 lie to the side of and alongside the monitoring region 23.

To the extent that the receiver of the light grid arrangement is intended to be incorporated in a housing 28 the theoretically possible monitoring region 23 will be somewhat foreshortened as is indicated at 23' in FIG. 3. In this manner both transmitter and receiver can however be constructed as compact boxes. As the object distance "a" is at least 10 times as large as the focal length of the concave mirror 24 not much of the length of the monitoring region is lost by building the receiver into a block-shaped housing 28.

The term "useful light beam" as used in this specification embraces that part of the total light beam which leaves each diode and which reaches the photodetector through the slot aperture 25.

By arranging a plurality of concave mirrors 24 in a row the length of the monitoring region can be increased practically as desired. FIG. 4 shows the simplest case of a row of two concave mirrors 24 the ends of which lie directly adjacent and border on one another. In correspondence with the embodiment of FIG. 2 a slot aperture 25 and a photodetector 18 are associated with each concave mirror 24. The two photodetectors 18 are applied in parallel to the threshold amplifier 16 and to the potentiometer 27.

Light emitting diodes 0 to 9 are associated with each concave mirror 24 analogously to the preceding embodiment. A further diode $\bar{0}$ is provided opposite to the line of contact between the two concave mirrors 24 in order to avoid a reduction of the resolution capability at the joint position of the two concave mirrors 24.

In accordance with FIG. 4 all the diodes are connected to the ring counter 11 which cyclically switches them on one after the other in accordance with the previously described embodiment. The switching of the diodes thus takes place in the sequence 0 to 9, $\bar{0}$, 0 to 9, 0 to 9, $\bar{0}$ etc. Because of the parallel connection of the photodetectors 18 the arrangement of FIG. 4 behaves in the same way as the embodiment described in relation to FIGS. 1 to 3.

For the purposes of adjustment of the embodiment of FIG. 4 the two outermost light emitting diodes 0 and 9 are associated with the adjustment indicating lamps 19 and 20 respectively.

For the case in which significantly more than two concave mirrors are connected together to form a single light grid arrangement, the switching of the individual light emitting diodes one after the other could require so much time that the switching speed necessary to detect intervention in the light grid is no longer achieved. In this case the light emitting diodes can be connected in groups together to a special ring counter 11 in dependence on the reaction speed which it is desired to achieve.

FIG. 4 additionally shows how a constant resolution capability can be achieved over the whole scanning width of a concave mirror 24 by varying the spacing of the light emitting diodes from the center of the concave mirror 24 to the margins. Because of the spherical aberration the resolution capability of a concave mirror from the optical axis towards the margins decreases, in particular at large aperture ratios. By correspondingly reducing the spacing between light emitting diodes going outwardly from the optical axis this effect can so strongly counteracted that a substantially constant resolution capability is maintained across the whole scanning width of a concave mirror 24.

The reducing diode spacing from the center outwardly can also be used in similar manner and with the same effect in the embodiments of FIGS. 1 to 3.

The concave mirror can be either of spherical, parabolic or cylindrical curvature.

It will be appreciated by those skilled in the art that further modifications can be made to the above described arrangements without departing from the scope of the present teaching.

We claim:

1. A light grid arrangement comprising a row of light emitting semiconductor elements, switching means for periodically and cyclically switching said light emitting semiconductor elements on one after the other, a monitoring region and image forming optical means which receives the light transmitted from the semiconductor elements through the monitoring region and which concentrates this light onto a photodetector, the arrangement further including a slot aperture located at the focal point of said image forming optical means, the slot of said slot aperture extending substantially at right angles to the row of light emitting semiconductor elements, the slot having a width so that the light leaving said light emitting semiconductor elements is trimmed in the direction of the row, whereby only a part of the light beam which is received by the image forming means can reach said photodetector which is arranged behind said slot aperture and which receives all the light passing through said slot.

2. A light grid arrangement in accordance with claim 1 wherein said light emitting semiconductor elements comprise light emitting diodes.

3. A light grid arrangement in accordance with claim 1 and wherein said photodetector comprises a single photodetector element.

4. A light grid arrangement according to claim 1 wherein the object distance is at a maximum 50 times as large as the focal length of said image forming optical means.

5. A light grid arrangement in accordance with claim 1 wherein said slot has a width so that only the useful light beams from neighbouring light emitting semiconductor elements overlap.

6. A light grid arrangement in accordance with claim 5 wherein the useful light beams of neighbouring light emitting semiconductor elements overlap by an amount in the range from ⅓ to ⅔ of their width at the image forming optical means.

7. A light grid arrangement according to claim 6 wherein the ratio of the width of said slot to the focal length of the image forming optical means preferably lies in the range from $0.2 \times 10^{-3}$ to $2 \times 10^{-3}$.

8. A light grid arrangement according to claim 6 wherein the useful light beams of neighboring light emitting semiconductor elements overlap by an amount of about one-half of their width at the image-forming optical means.

9. A light grid arrangement according to claim 1 wherein said image forming optical means is of strip-like construction and extends parallel to said row of light emitting semiconductor elements.

10. A light grid arrangement according to claim 1 wherein said image forming optical means comprises a concave mirror.

11. A light grid arrangement according to claim 10 wherein said concave mirror is so tilted about its longitudinal axis that the photodetector and the aperture lie outside of the monitoring region.

12. A light grid arrangement according to claim 1 including a plurality of said image forming optical means with slot aperture and photodetector arranged directly alongside one another.

13. A light grid arrangement according to claim 12 and characterized in that neighbouring image forming optical means directly contact one another.

14. A light grid arrangement according to claim 12 wherein the photodetectors are connected in parallel to electronic processing circuitry.

15. A light grid arrangement in accordance with claim 12 including an additional light emitting semiconductor element provided between neighbouring rows of light emitting semiconductor elements whereby to direct light substantially at the seam between neighbouring image forming optical means.

16. A light grid arrangement according to claim 1 wherein the spacing of the light emitting semiconductor elements decreases in the outward direction away from the optical axis of the image forming optical means.

* * * * *